United States Patent [19]
Nayak

[11] Patent Number: 6,059,212
[45] Date of Patent: *May 9, 2000

[54] TAPE MOVING MECHANISM USING A DIRECT DRIVE MOTOR

[75] Inventor: Ashok B. Nayak, Glendora, Calif.

[73] Assignee: Seagate Technology, Inc., Scotts Valley, Calif.

[*] Notice: Under 35 U.S.C. 154(b), the term of this patent shall be extended for 53 days.

[21] Appl. No.: 08/596,538

[22] Filed: Feb. 5, 1996

[51] Int. Cl.[7] .............................. G11B 15/32; G11B 23/04
[52] U.S. Cl. ....................... 242/338; 242/340; 242/356.7; 360/94
[58] Field of Search ............................. 242/352.4, 352.3, 242/352, 349, 356.7, 338, 340; 310/67 R; 360/96.4

[56] References Cited

U.S. PATENT DOCUMENTS

| | | | |
|---|---|---|---|
| 3,659,806 | 5/1972 | Crafts | 360/96.4 X |
| 5,272,579 | 12/1993 | Ohkubo et al. | 360/96.4 X |

*Primary Examiner*—John Q. Nguyen
*Attorney, Agent, or Firm*—McDermott, Will & Emery

[57] ABSTRACT

A tape drive arrangement and method for driving a cartridge roller in a tape cartridge that advances tape in a tape cartridge. The tape drive has a drive motor and having a rotatable outer housing, and a cartridge roller contact surface around the outer housing of the drive motor. The drive motor is positioned within the tape drive so that the cartridge roller of a tape cartridge that has been inserted into the tape drive directly contacts the cartridge roller contact surface. The cartridge roller is directly driven by the drive motor upon rotation of the outer housing of the drive motor.

12 Claims, 6 Drawing Sheets

TAPE MOVING MECHANISM USING A DIRECT DRIVE MOTOR

BACKGROUND OF THE INVENTION

1. Field of the Invention

The present invention relates to the field of tape drives for recording information, and more particularly, to arrangements and methods for driving the cartridge roller of a tape cartridge.

2. Description of Related Art

Tape drives for recording information, such as digital data, typically employ an electric motor and an arrangement for transferring the force of the motor to drive the cartridge roller of a tape cartridge. The cartridge roller moves a belt within the tape cartridge that advances the tape within the cartridge. The tape is moved past a read/write head arrangement that reads and writes data from and to the tape.

A top view of a conventional tape drive is depicted in FIG. 1. The tape drive 10 receives a tape cartridge 12 on which data is to be written or from which data is to be read. Upon full insertion of the tape cartridge 12 in to the tape drive 10, a cartridge roller 18 bears against an idler 16, and pushes the idler into driving contact with a motor 14. Insertion of the tape cartridge 12 opens a cartridge door 20, exposing an opening 22 by which the tape in the cartridge 12 passes. The read/write head 24 is positioned at the opening 22 for reading and writing the digital information.

The cartridge roller 18 is driven by rotation of the motor 14, via the idler 16, to advance the tape contained within the tape cartridge 12. An idler 16, or some other arrangement, is needed to transfer the motor force to the cartridge roller 18 since the motor 14 is too large to be brought to bear directly against the cartridge roller 18 because of the presence and location of read/write head 24 in relation to the cartridge roller 18.

A side view of the motor 14, idler 16, and tape cartridge 12 of FIG. 1 is depicted in FIG. 2A. Because of the indirect driving of the cartridge roller 18, this arrangement has a number of disadvantages, including the need for a number of additional elements, such as a driver 26 and bearings 28 for the idler 16. The driver 26 is coupled to the motor 14, and the idler 16 has an elastomeric coating 30. These elements add to the cost of the tape drive, result in lower performance due to loss of motion, and increase the size of the tape drive.

Different arrangements for driving the cartridge roller 18 of a tape cartridge 12 are depicted in FIGS. 2B and 2C. In FIG. 2B, the motor 34 rotates an attached pulley 36 that drives a belt 32. A second pulley 38 is driven by the belt 32. A capstan 40 is attached to the second pulley 38 and bearings 42 are provided. This arrangement suffers the same disadvantages as that of FIG. 2A, with the additional disadvantage of the need for belt replacement.

The arrangement of FIG. 2C overcomes the loss of motion in the other described arrangements by using a motor 44 with an extended shaft 46 and a capstan 48 at the end of the shaft 46. While this arrangement also reduces the number of elements and provides a direct drive of the cartridge roller 18, the extended shaft makes the arrangement excessively high, so that the size of the tape drive in the vertical direction would have to be increased to accommodate the arrangement. This runs counter to the current design philosophy in the computer industry to provide compact devices, rendering a tape drive employing this arrangement undesirable.

SUMMARY OF THE INVENTION

There is a need for a tape drive that has an arrangement for driving a cartridge roller of a tape cartridge, with a reduced number of elements and loss of motion, but without increasing the space required for accommodating the arrangement in the tape drive. These and other needs are met by the present invention which provides a tape drive for driving a cartridge roller in a tape cartridge that advances tape in the tape cartridge. The tape drive comprises a drive motor mounted in the tape drive and having a rotatable outer housing, and a cartridge roller contact surface around the outer housing of the drive motor. The drive motor is positioned within the tape drive such that the cartridge roller of a tape cartridge that has been inserted into the tape drive directly contacts the cartridge roller contact surface and is thereby directly driven by the drive motor upon rotation of the outer housing of the drive motor.

The provision of a drive motor with a cartridge roller contact surface on its rotatable outer housing permits a direct driving of the cartridge roller of a tape cartridge. The present invention takes advantage of advances in magnets to use a drive motor that is more compact than those previously used in tape drives, by arranging the cartridge roller contact surface on the rotatable outer housing of the drive motor. The more compact drive motor may be used to drive the cartridge roller of a tape cartridge directly, without contacting or interfering with the read/write head. The provision of the cartridge roller contact surface on the outer housing of the drive motor eliminates the need for additional parts between the drive motor and the cartridge roller. These include the belts, pulleys, idlers and extended shafts of the prior art.

Another advantage made possible by embodiments of the present invention is the decrease in size of the tape drive that occurs since the smaller motor may be placed directly against the cartridge roller of a tape cartridge. The additional space required by the additional elements used in the prior art, in both the vertical and horizontal directions, is eliminated in the present invention.

The cost of the tape drive of the present invention is reduced in comparison to known drives due to the elimination of additional elements. At the same time, the reliability of the tape drive is increased since there are fewer parts, such as ball bearings and belts that will eventually wear out. The tape drive of the present invention is also relatively more efficient as there is a reduction in lost motion due to the direct driving of the cartridge roller.

Another aspect of the present invention that meets the earlier stated needs provides a direct drive mechanism for driving a cartridge roller of a tape cartridge, the direct drive mechanism comprising a motor having an outer housing that forms a rotor of the motor, and a capstan. The capstan is concentrically mounted on the rotor to rotate with the rotor. The capstan has a contact surface for contacting and directly driving a cartridge roller of a tape cartridge upon rotation of the rotor.

A still further aspect of the present invention provides a method of advancing tape in a tape cartridge, comprising the steps of positioning a cartridge roller of a tape cartridge against a capstan that encircles a rotor of a motor, and applying power to the motor to cause the rotor to rotate. The capstan thereby rotates to cause the cartridge roller to rotate and advance the tape in the cartridge.

The positioning of a cartridge roller against a capstan that encircles the rotor of a motor allows the cartridge roller to be directly driven, and eliminates the need for additional parts, with the earlier stated attendant advantages.

The foregoing and other features, aspects and advantages of the present invention will become more apparent from the following detailed description of the present invention when taken in conjunction with the accompanying drawings.

DETAILED DESCRIPTION OF ILLUSTRATIVE EMBODIMENTS

Figure 3:
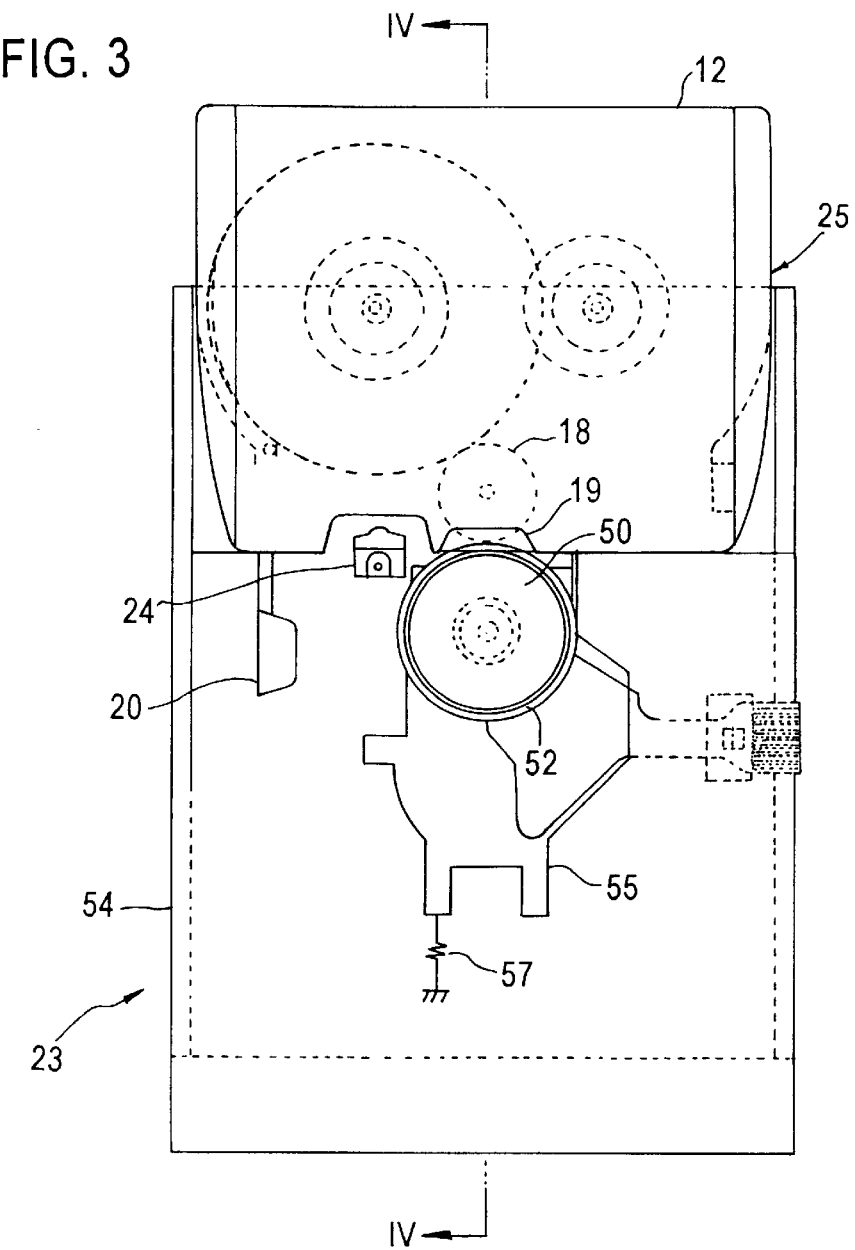
FIG. 3 is a top sectional view of a tape drive constructed in accordance with an embodiment of the present invention.
Figure 4:
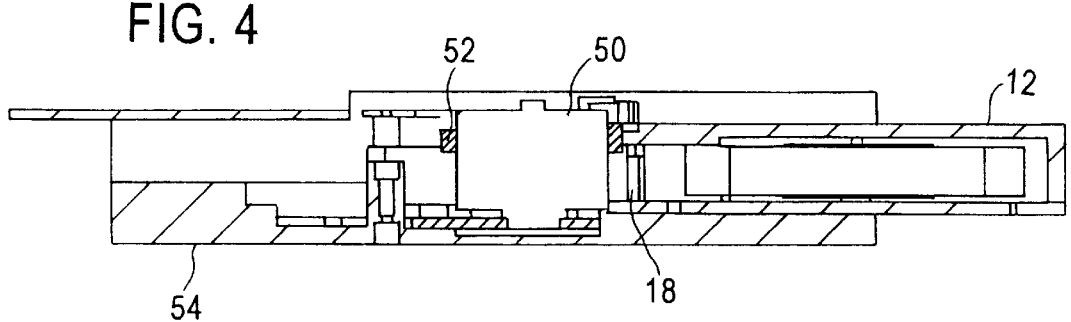
FIG. 4 is a side view of the tape drive of FIG. 3.

FIGS. 3 and 4 depict a tape drive 23 constructed in accordance with an embodiment of the present invention, utilizing a direct drive motor that does not require the tape drive 23 to have a large vertical height to accommodate a vertical shaft extending from the motor and carrying a capstan. Instead, as will be described, the capstan is carried directly on the motor, providing an extremely compact design.

The tape drive 23 of the present invention receives a conventional tape cartridge 12 in a drive opening 25. As the tape cartridge 12 is fully inserted into the opening 25 of the tape drive 23, the cartridge door 20 of the tape cartridge 12 is swung open into the position illustrated in FIG. 3. This action exposes the tape in the cartridge 12 to the read/write head 24 in the tape drive 23.

The tape in the tape cartridge 12 is advanced within the cartridge 12 by rotation of the cartridge roller 18, as is conventional. The rotation of the cartridge roller 18 moves a belt (not depicted) within the cartridge 12 that advances the tape. The cartridge roller 18 is rotated by the rotation of a motor 50 around which a capstan 52 is mounted. The capstan 52 may be, for example, an elastomeric material formed concentrically around the outer housing of the motor 50. Full insertion of the tape cartridge 12 into the tape drive 23 places the cartridge roller 18 into direct driving contact with the capstan 52.

In the exemplary embodiment of FIG. 3, the motor 50 is mounted on a plate 55 movably mounted to a frame 54 of the tape drive 23. The plate 55 is biased by a spring 57, for example, towards the drive opening 25. The complete insertion of the tape cartridge 12 pushes against the capstan 52 of the motor 50, causing the plate 55 to move in the insertion direction, away from the drive opening 25. The biasing of the plate 55, and therefore the motor 50 and capstan 52, against the cartridge roller 18 ensures good driving contact between the capstan 52 and the roller 18. Although a spring 57 is depicted in FIG. 3, other biasing arrangements are contemplated within the scope of the invention. For example, the plate 55 may be stationary and the motor 50 mounted on the plate 55 in a movable fashion.

Figure 8:
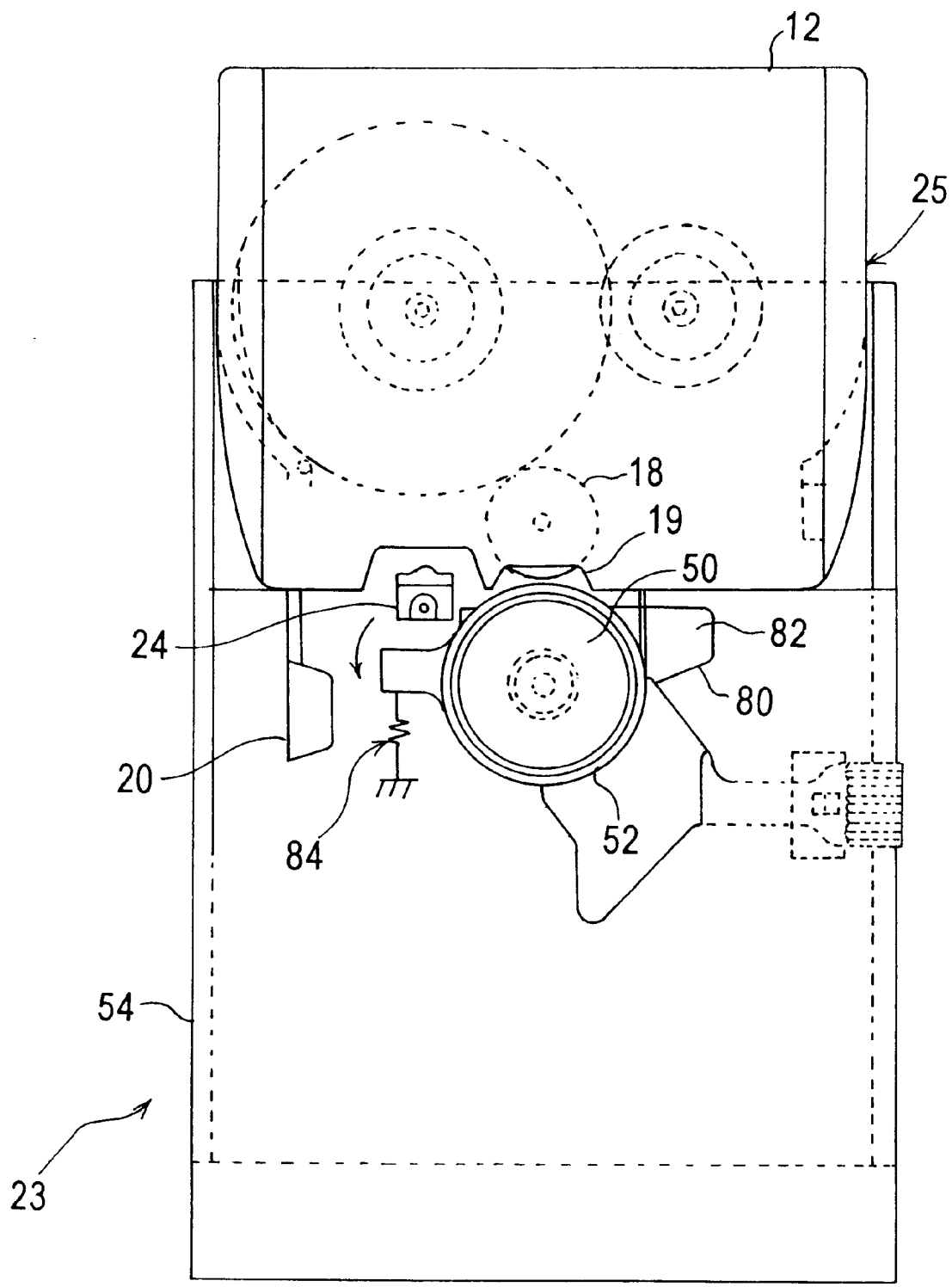
FIG. 8 is a top sectional view, similar to FIG. 3, of a tape drive constructed in accordance with another embodiment of the present invention.

FIG. 8 depicts an embodiment similar to that of FIG. 3, but has a plate 80 that pivots around a pivot point 82 when a tape cartridge 12 is inserted into the tape drive, instead of sliding back linearly. The pivoting action is resisted by a biasing mechanism, such as a spring 84. This ensures that the capstan 52 will bear against the cartridge roller 18 with sufficient force to allow it to drive the cartridge roller 18. The spring 84 urges the plate 80 into its original position when the cartridge 12 is removed.

Figure 1:
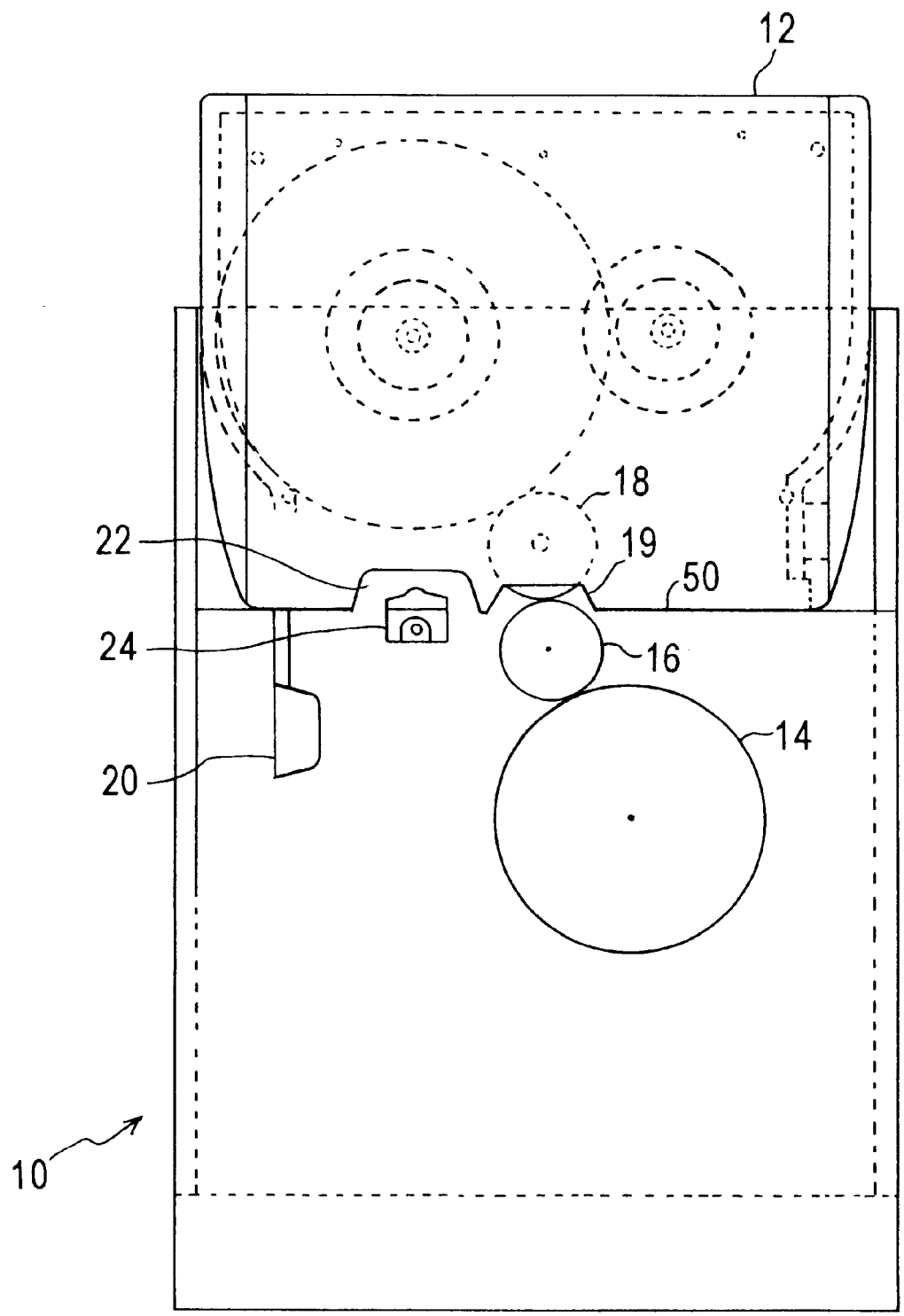
FIG. 1 is a top sectional view of a known tape drive.
Figure 2A:
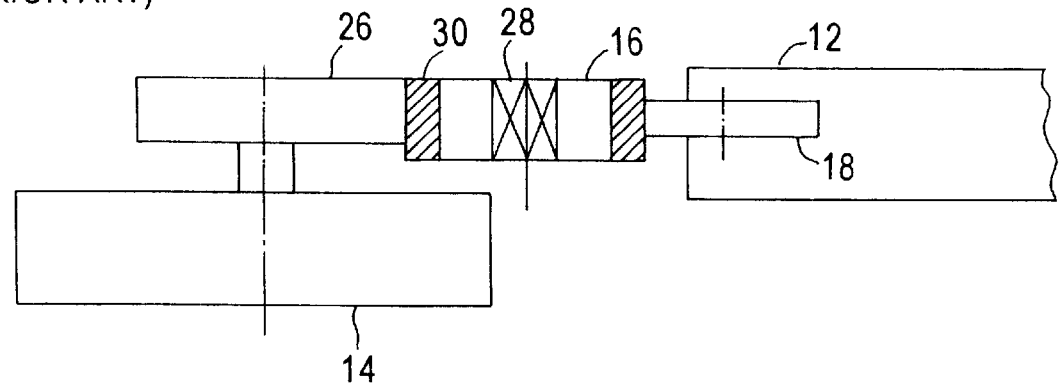
FIGS. 2A–2C are side views of different known arrangements of the drive mechanism of a tape drive.
Figure 2B:
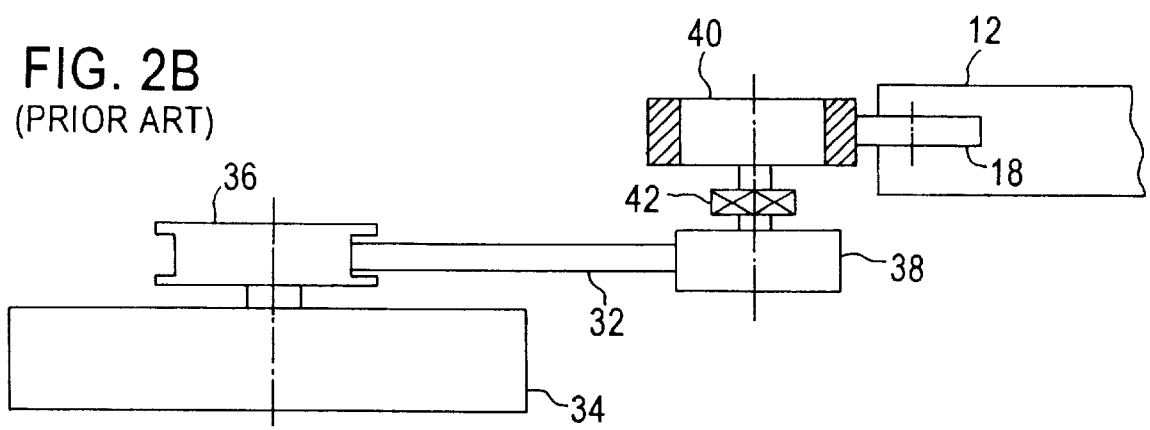
Figure 2C:
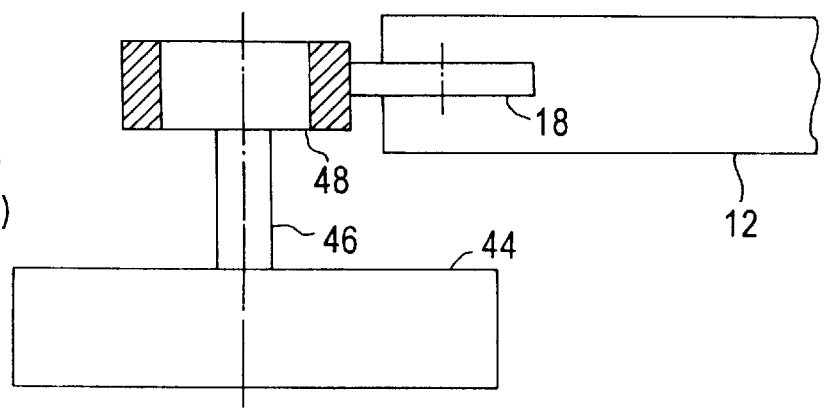

Returning to FIG. 3, as apparent from the top view, the diameter of the motor 50 and capstan 52 arrangement is such that the capstan 52 contacts the cartridge roller 18 but clears the sides of the cartridge roller opening 19. The diameter of the arrangement is also small enough so that there is a clearance between the read/write head 24 and the capstan 52. Motors used in known tape drives have typically had larger diameters, so that they could not be brought into direct driving contact with the cartridge roller 18 without hitting the read/write head 24. This forced the motor to be separated from the cartridge roller 18 by a distance, either horizontally or vertically, as seen in FIGS. 2A–2C, with some arrangement to transfer the motor power to a relatively small wheel nearer the cartridge roller 18. Hence, either the length of the drive is increased (FIGS. 2A and 2B) or the height of the drive is increased (FIG. 2C).

The present invention takes advantage of the availability of motors with more compact and powerful magnets, so that the overall size of the motor is smaller than the motors used in previous tape drives. For example, a motor using bonded neodymium iron boron magnets, known to those of skill in the art, may be constructed that will be powerful enough to drive the cartridge roller 18 as conventional motors, but have a compact design that allows direct driving of the cartridge roller 18.

Figure 5:
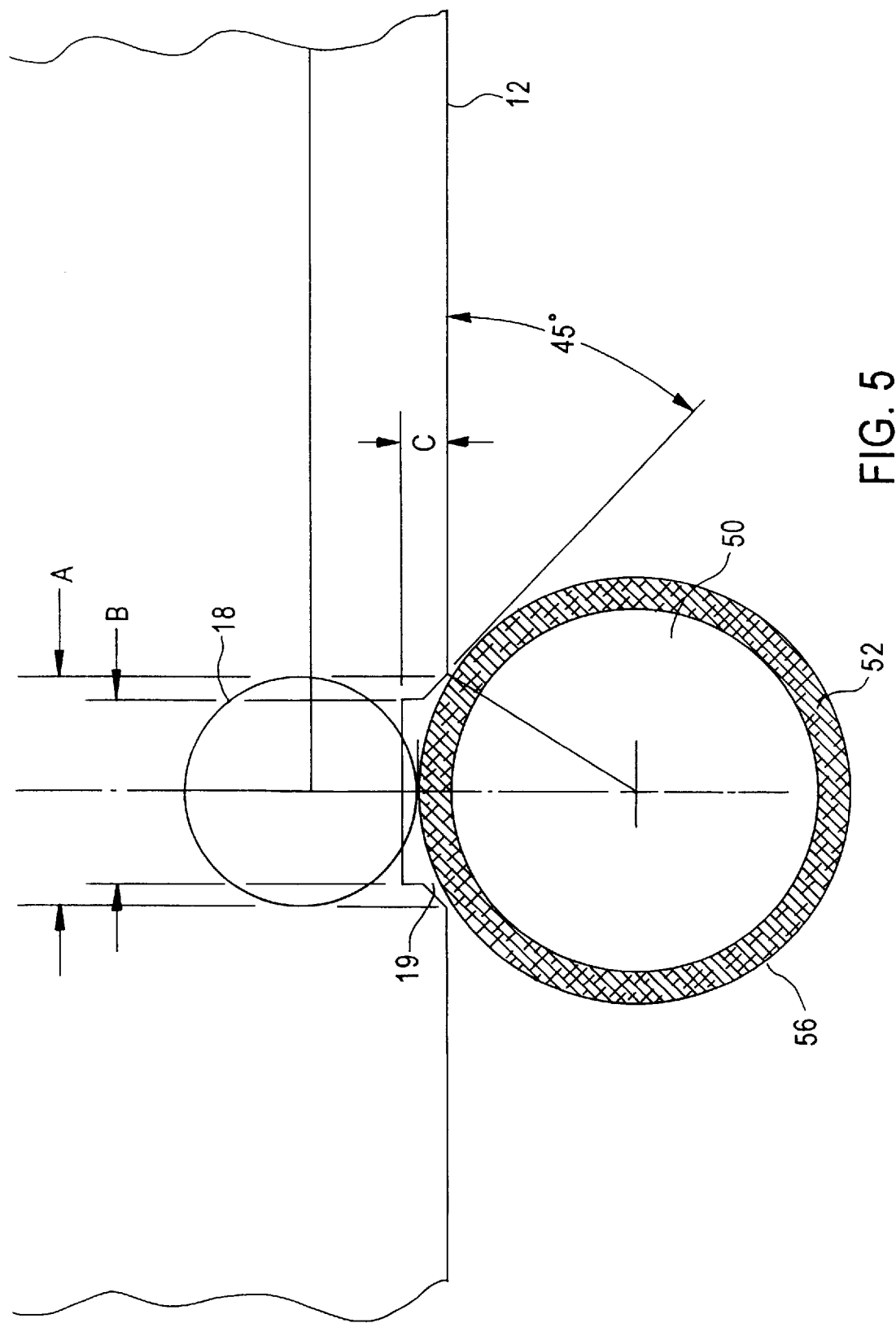
FIG. 5 is a top view of a capstan and cartridge roller interface in accordance with an embodiment of the present invention.

A detail of the motor 50 and capstan 52 interface with the cartridge roller 18 according to an exemplary embodiment of the present invention is depicted in FIG. 5. As exemplary values only, the cartridge roller may be 0.625 inches in diameter (arrows A). The diameter of the motor 50 is 0.978 inches, and the diameter of the motor 50 with the capstan 52 mounted on the outside of the motor 50 is 1.160 inches. The capstan 52 has a cartridge roller contact surface 56 that contacts the cartridge roller 18 when the tape cartridge 12 is fully inserted into the tape drive 23.

The cartridge roller opening 19 of the tape cartridge 12 has an inner opening of 0.500 inches (arrows B), for example, and an outer opening of 0.625 inches. The depth of the cartridge roller opening 19 (arrows C) is 0.124 inches. All of the above numbers for the motor, capstan, and tape cartridge are exemplary only, as appreciated by one of ordinary skill in the art.

Figure 6:
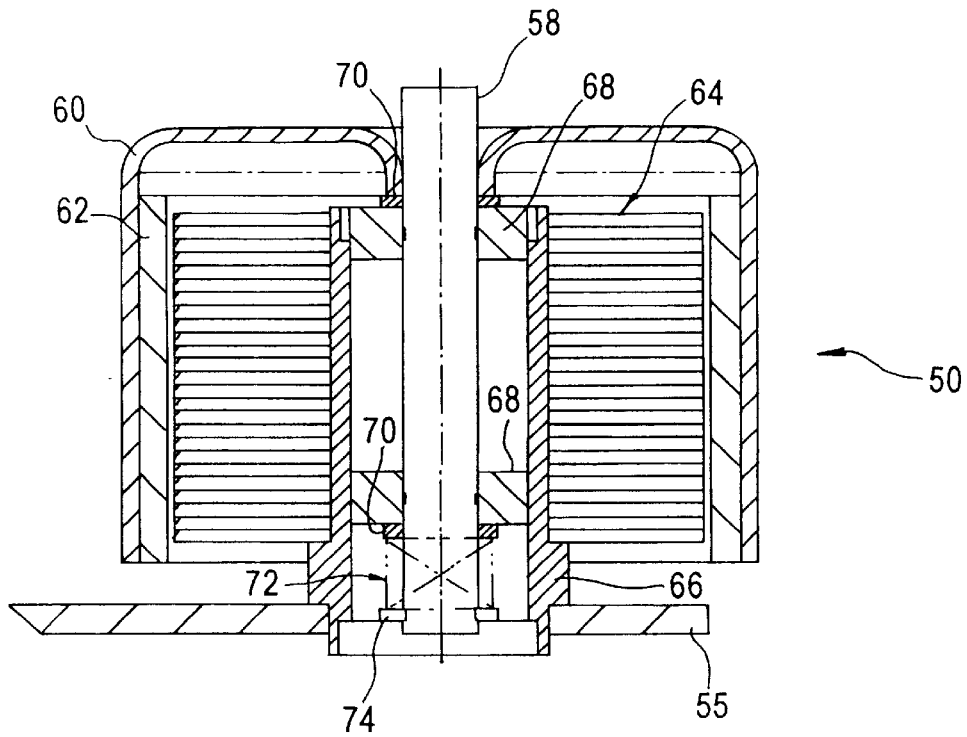
FIG. 6 is a cross-sectional side view of a motor used in the embodiment of the tape drive of FIG. 3.

FIG. 6 is a cross-sectional side view of a motor that can be used in the tape drive of the present invention. The motor 50 has a stationary element 66 mounted to the plate 55. A shaft 58 is mounted within the stationary element 66 and is spaced from the stationary element 66 by ball bearing 68. Bearing spacers 70 are provided, and a spring 72 separates one of the bearing spacers 70 from a retaining ring 74 that retains the shaft 58 in position.

The motor 50 has an outer housing 60, connected to the shaft 58, that serves as the rotor of the motor 50. Attached to the outer housing 60 are magnets 62, which in the exemplary embodiment of FIG. 6, are neodymium iron boron magnets. In other embodiments of the invention, different types of magnets are used. However, such magnets need to be powerful and compact enough to allow the motor to have a small outer diameter to directly drive the cartridge roller of a tape cartridge, without the need for a shaft extension or other arrangement.

Figure 7:
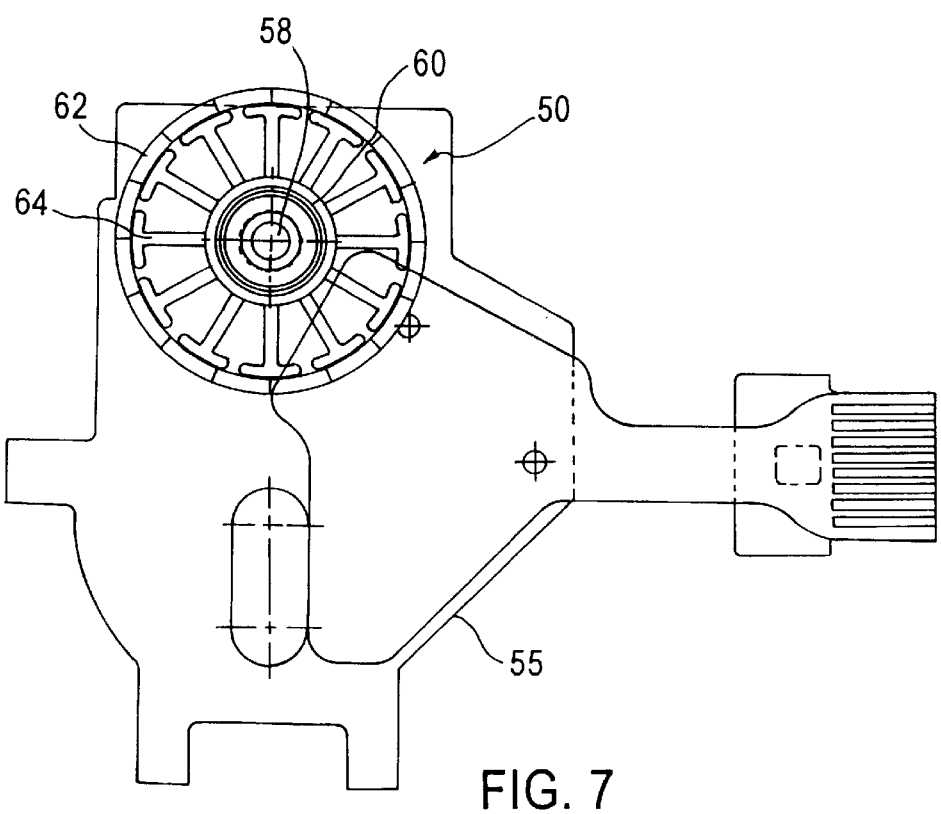
FIG. 7 is a cross-sectional top view of the motor of FIG. 6.

The magnets 62 and the outer housing 60 rotate around the laminations 64 of the motor 50. An elastomeric material, for example, may be provided concentrically around the outer housing 60 of the motor 50 to form the capstan 52, shown in FIG. 5 but not in FIG. 6. A top sectional view of the motor 50, which does not include the outer housing 60 for clarity of illustration, is provided in FIG. 7. The position of the motor 50 when mounted on the plate 55 is depicted in FIG. 7.

The employment in a motor of small, high-power magnets such as bonded neodymium iron boron magnets, permits such a motor to be outfitted with a concentrically surrounding capstan and used to directly drive a cartridge roller in a compact tape drive, without the need for additional driving elements. This reduces the cost and size of the tape drive, and also increases its reliability.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A tape drive for driving a cartridge roller in a tape cartridge that advances tape in the tape cartridge, the tape drive comprising:

a movable plate arranged to move in a linear direction parallel to a direction of insertion of the tape cartridge in the tape drive;

a drive motor mounted to the movable plate and having a rotatable outer housing; and a cartridge roller contact surface mounted on and around the outer housing of the drive motor;

wherein the movable plate and drive motor are positioned within the tape drive such that the cartridge roller of the tape cartridge that has been inserted into the tape drive directly contacts and bears upon the cartridge roller contact surface and is thereby driven rotatably by the drive motor upon rotation of the outer housing of the drive motor.

2. The tape drive of claim 1, wherein the cartridge roller contact surface is an elastomeric ring concentrically arranged on the outer housing of the drive motor.

3. The tape drive of claim 2, wherein the movable plate is spring biased in a direction opposite to a direction of insertion of the tape cartridge in the tape drive.

4. The tape drive of claim 3, wherein the elastomeric ring is a capstan, and the outer housing of the drive motor forms the rotor of the drive motor.

5. The tape drive of claim 4, wherein the drive motor includes at least one neodymium iron boron magnet.

6. The tape drive of claim 4, wherein an outer diameter of the capstan is approximately 1.8 times an outer diameter of the cartridge roller of a tape cartridge.

7. The tape drive of claim 6, wherein the outer diameter of the capstan is approximately 1.16 inches.

8. The tape drive of claim 4, wherein an outer diameter of the rotor is approximately 1.6 times an outer diameter of the cartridge roller of a tape cartridge.

9. The tape drive of claim 8, wherein the outer diameter of the rotor is approximately 0.98 inches.

10. A method of advancing tape in a tape cartridge, comprising:

inserting a tape cartridge into a tape drive in a substantially linear direction, the tape cartridge having a tape and a rotatable cartridge roller configured to advance the tape when rotated;

causing the cartridge roller to bear against a capstan that is mounted on and encircles a rotor of a motor, wherein the motor is movably disposed within the tape drive such that during at least a portion of the inserting of the tape cartridge into the tape drive the motor moves in the substantially linear direction with the tape cartridge; and applying power to the motor to cause the rotor to rotate, whereby the capstan rotates and causes the cartridge roller against which the capstan bears to also rotate and advance the tape in the cartridge.

11. The method of claim 10, wherein causing the cartridge roller to bear against the capstan further includes pushing against the cartridge roller of the tape cartridge with the capstan in a direction opposite to the substantially linear direction during the inserting of the tape cartridge into the tape drive and while applying power to the motor.

12. The method of claim 11, wherein the motor is mounted within the tape drive on a movable plate that is biased in the direction opposite to the substantially linear direction.

* * * * *